Oct. 1, 1935.　　　T. J. NUNAN　　　2,016,046
SPOOLING MACHINE
Filed Nov. 29, 1933　　　7 Sheets-Sheet 1

INVENTOR
Thomas J. Nunan
BY
Gifford, Scull & Burgess
ATTORNEYS

Oct. 1, 1935.  T. J. NUNAN  2,016,046
SPOOLING MACHINE
Filed Nov. 29, 1933   7 Sheets-Sheet 2
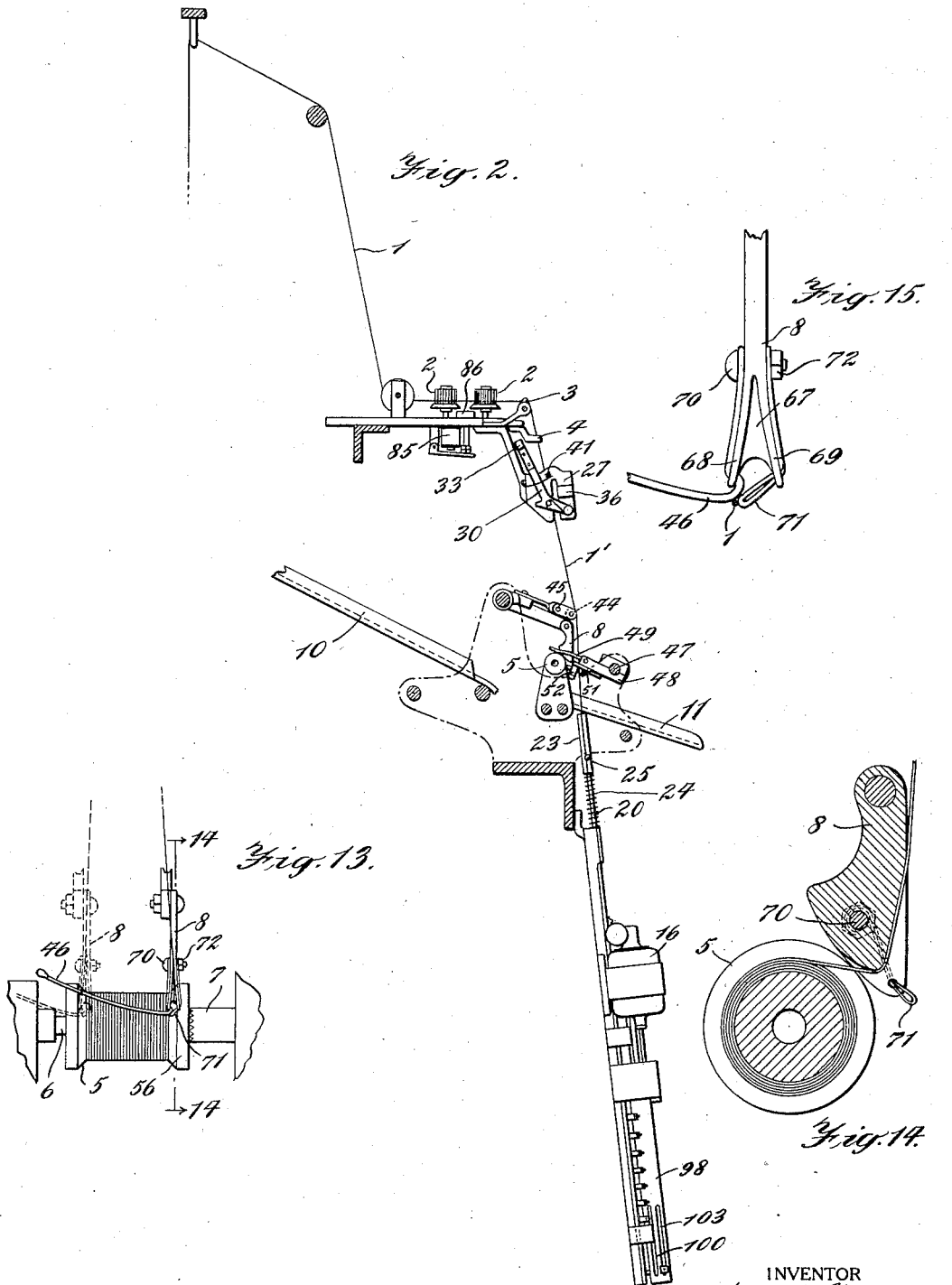
INVENTOR
Thomas J. Nunan
BY
Gifford, Scull & Burgess
ATTORNEYS

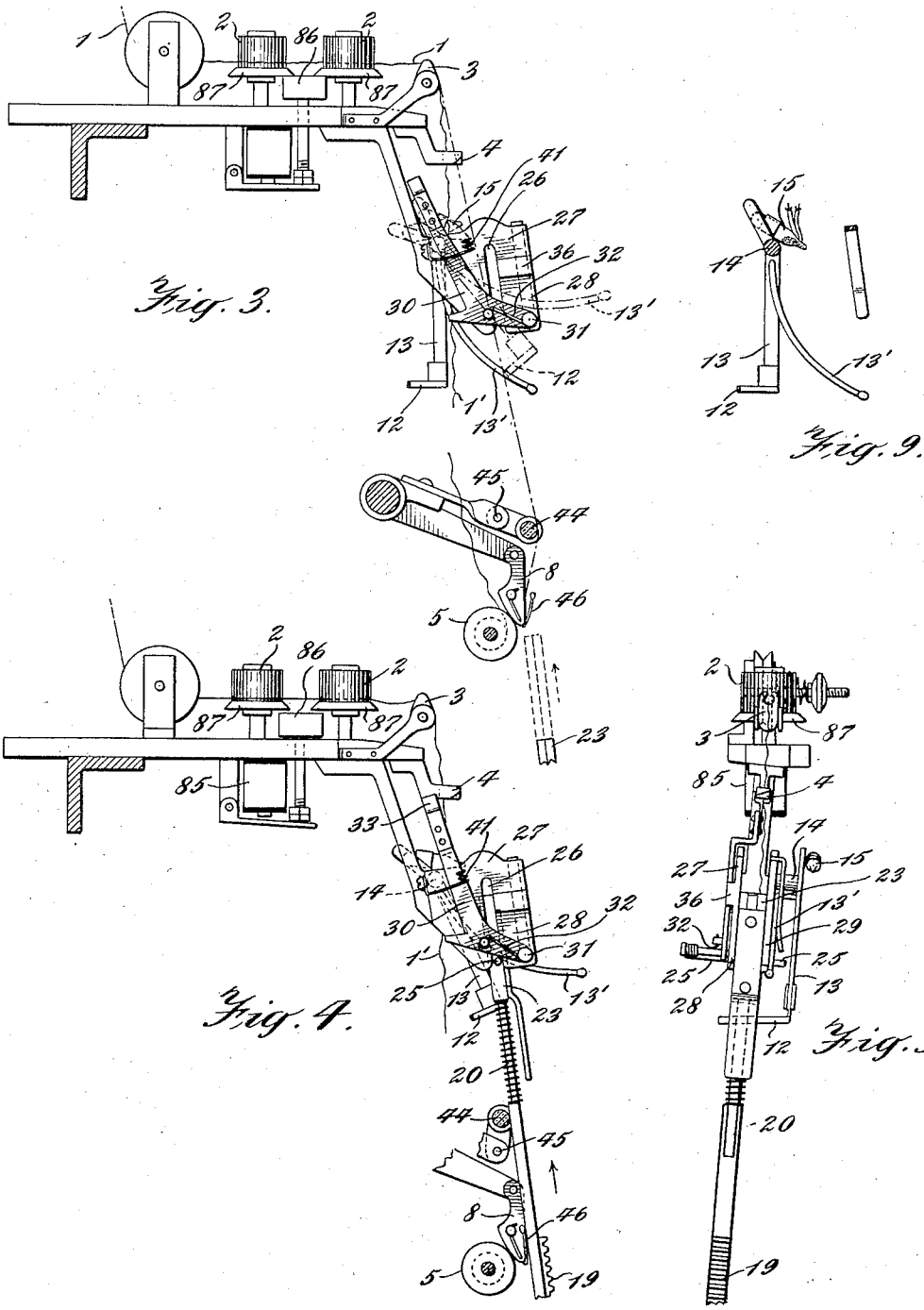

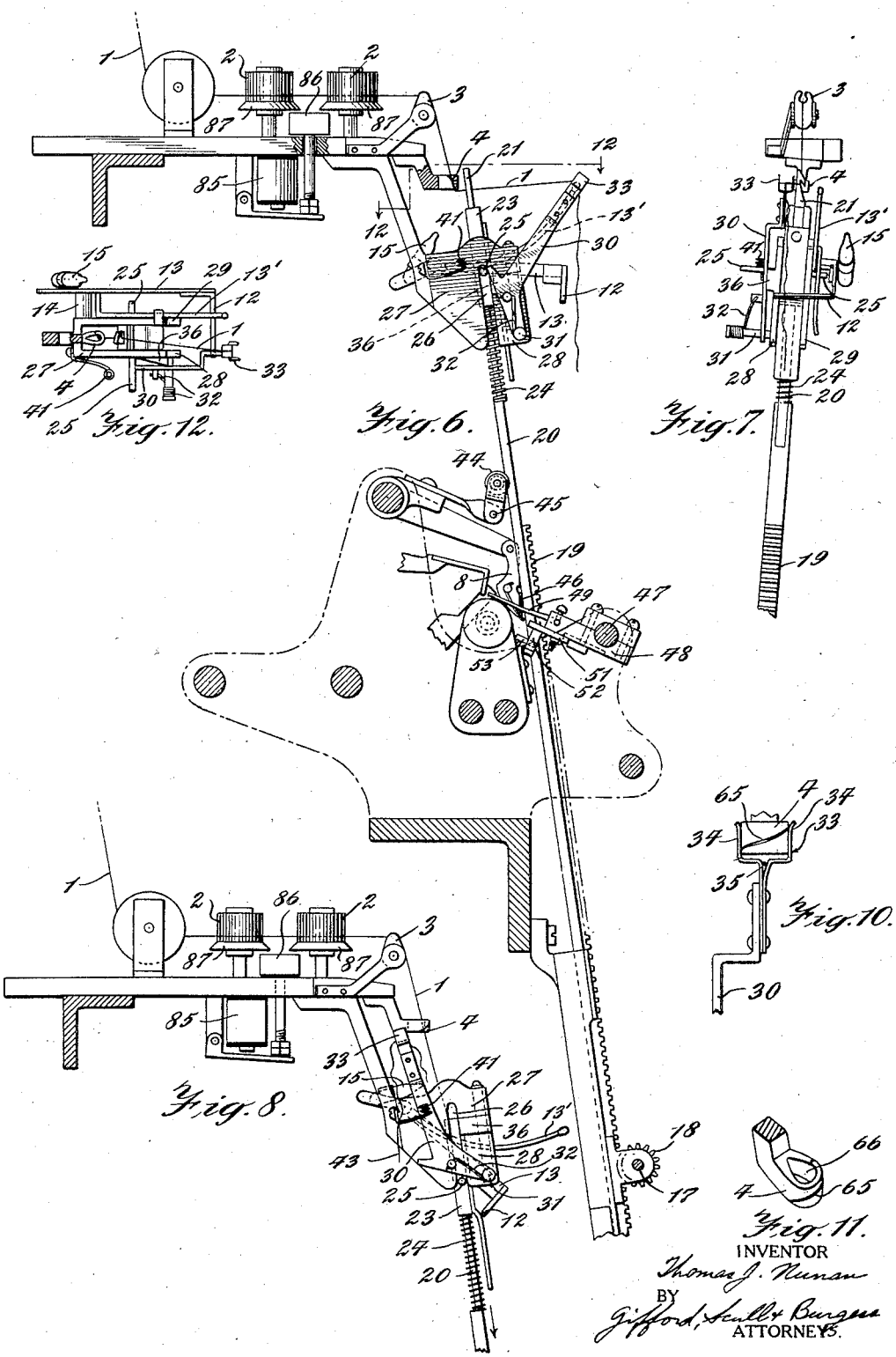

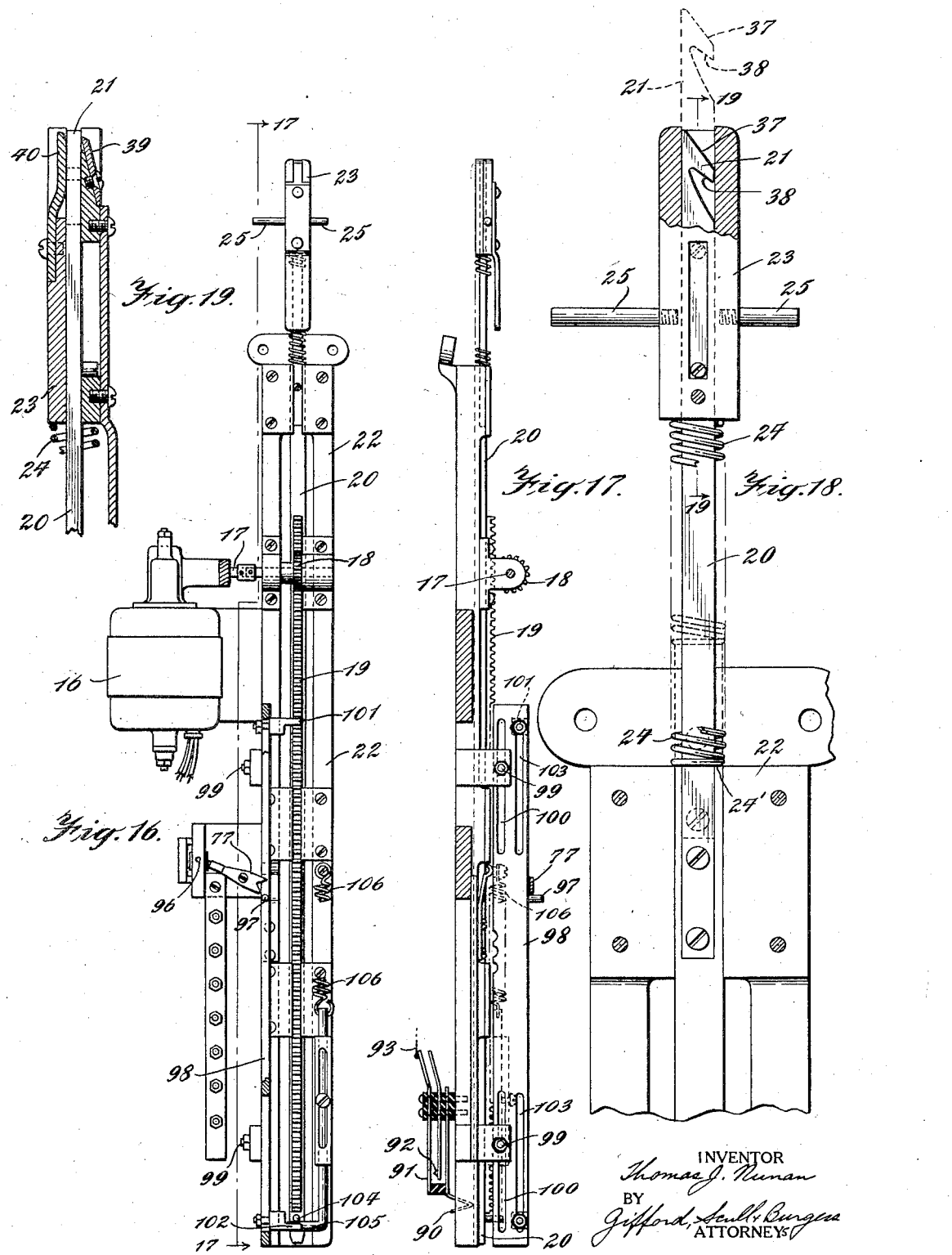

Oct. 1, 1935.  T. J. NUNAN  2,016,046
SPOOLING MACHINE
Filed Nov. 29, 1933  7 Sheets-Sheet 6

INVENTOR
Thomas J. Nunan
BY
Gifford, Scull & Burgess
ATTORNEYS.

Oct. 1, 1935.   T. J. NUNAN   2,016,046
SPOOLING MACHINE
Filed Nov. 29, 1933   7 Sheets-Sheet 7
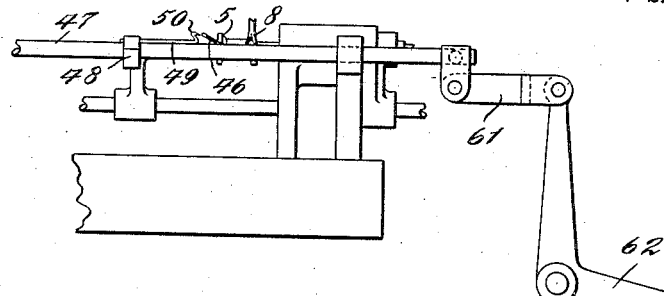
Fig. 26.
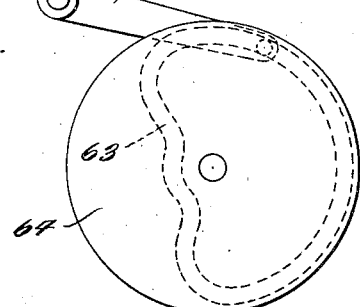
Fig. 27.
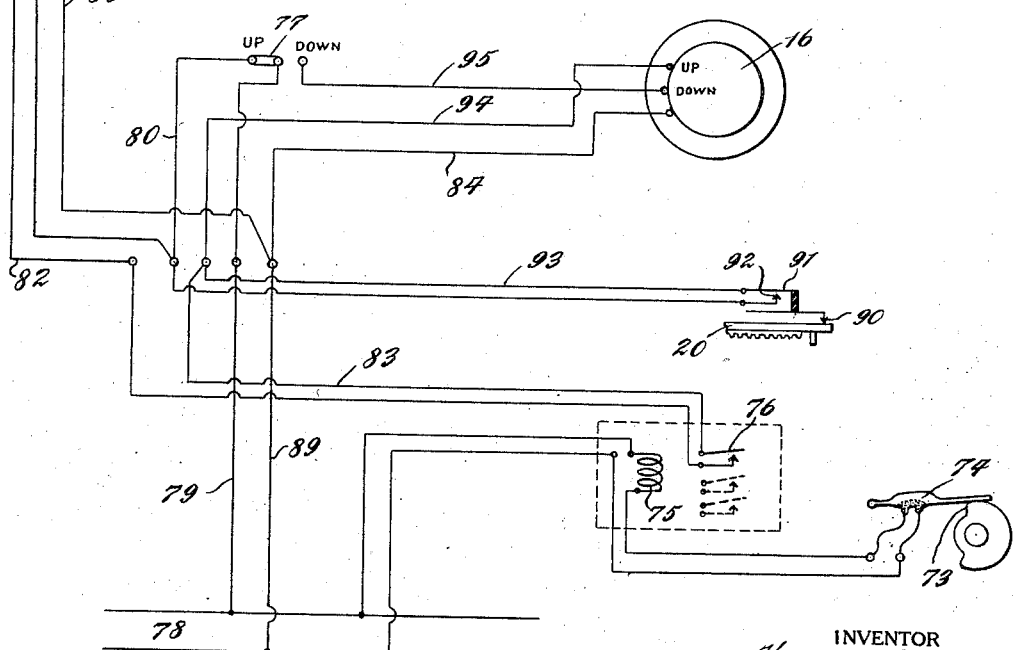
INVENTOR
Thomas J. Nunan
BY
Gifford, Scull & Burgess
ATTORNEYS.

Patented Oct. 1, 1935

2,016,046

UNITED STATES PATENT OFFICE 2,016,046

SPOOLING MACHINE

Thomas J. Nunan, Summit, N. J., assignor to The Clark Thread Company, Newark, N. J., a corporation of New Jersey Application November 29, 1933, Serial No. 700,217

45 Claims. (Cl. 242—16)

This invention relates to a new and useful improvement in a spooling machine, the novel features of which will be best understood from the following description and the annexed drawings, in which I have shown a selected embodiment of the invention and in which:

Fig. 2 is a view taken approximately on the line 2—2 of Fig. 1, here also only as much of the machine being shown as is necessary to an understanding of the invention and other parts being omitted;

Fig. 3 is a view taken on substantially the same plane as Fig. 2 but on a larger scale and showing parts of the mechanism appearing in Fig. 2, but in different positions, these positions being those occupied immediately upon breakage of a thread;

Fig. 4 is a view similar to Fig. 3 but showing a succeeding step in the operation following breakage of the thread;

Fig. 5 is a view taken from the right of Fig. 4;

Fig. 6 is another view similar to Figs. 3 and 4 but showing a still later step in the operation following breakage of the thread;

Fig. 7 is a view taken from the right of Fig. 6;

Fig. 8 is another view similar to Figs. 3, 4, and 6, but showing the position of the parts as the operation continues;

Fig. 9 is a view showing certain details appearing in Fig. 3;

Fig. 10 is a detail view of the thread holder;

Fig. 11 is a detail view of one of the guides shown in Fig. 3, for example;

Fig. 12 is a section approximately on the line 12—12 of Fig. 6;

Fig. 13 is a detail view showing the relation of the traveling guide to the spool upon which the thread is wound;

Fig. 14 is a section approximately on the line 14—14 of Fig. 13;

Fig. 15 is a view from the right of Fig. 14 and showing the detailed construction of the traveling guide;

Fig. 16 is a front view of the mechanism for operating the catch, this view being taken on the same plane as Fig. 1 but on a larger scale;

Fig. 17 is a section approximately on the line 17—17 of Fig. 16;

Fig. 18 is a view taken from the right of Fig. 17, parts being broken away and others shown in section and some parts being omitted for the sake of clearness;

Fig. 19 is a section on the line 19—19 of Fig. 18;

Figure 1:
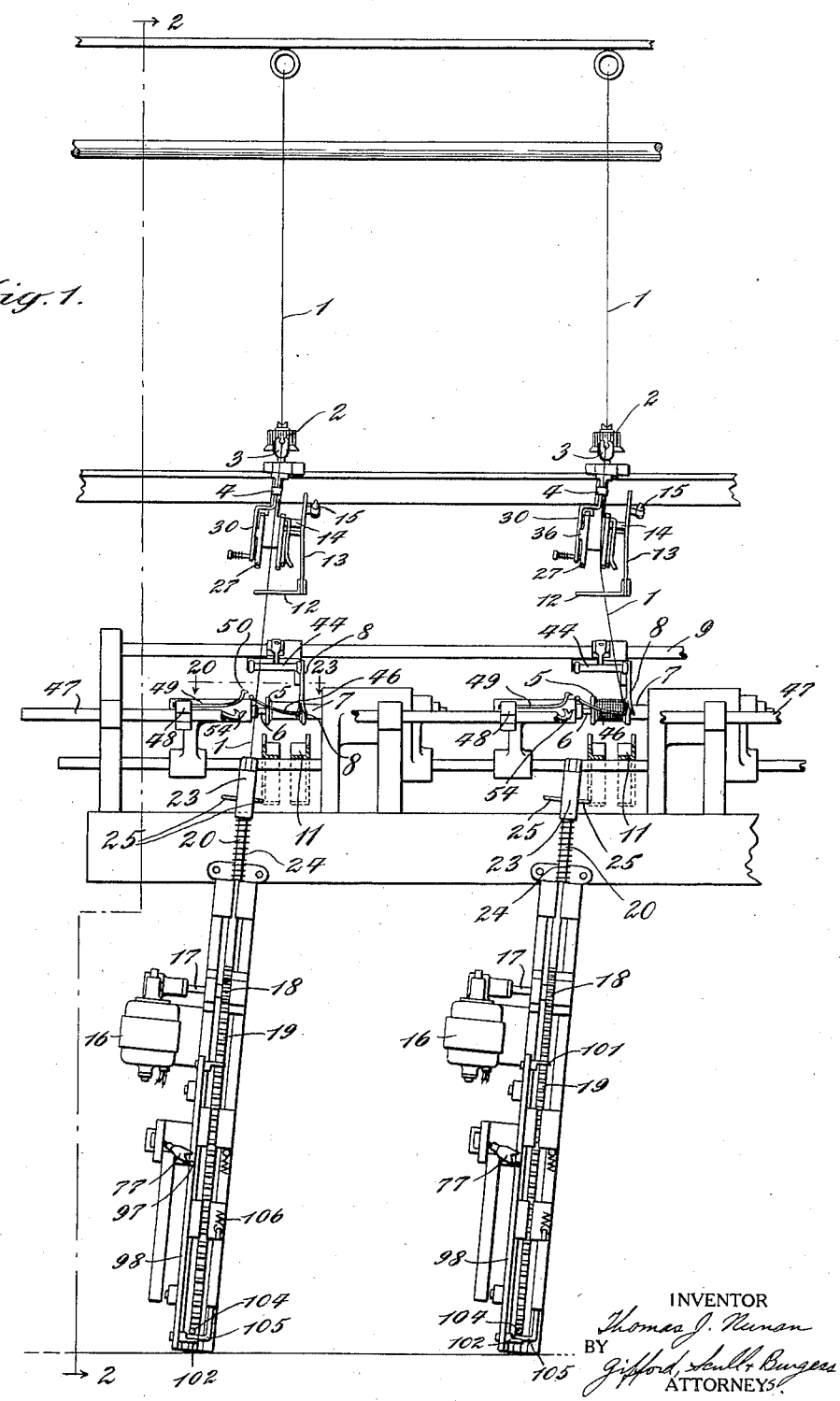
Fig. 1 is a front elevation of a portion of a spooling machine having my invention applied thereto, only so much of the spooling machine being shown as is necessary to an understanding of the invention.
Figure 24:
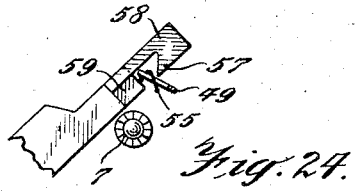
Figure 23:
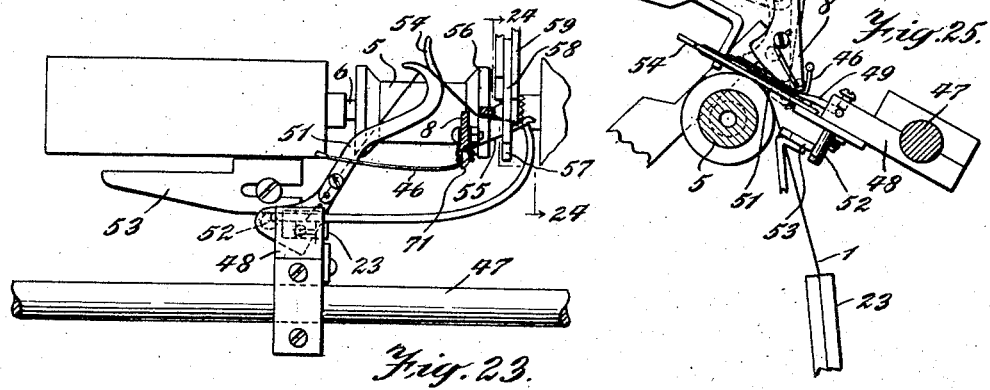
Figure 25:
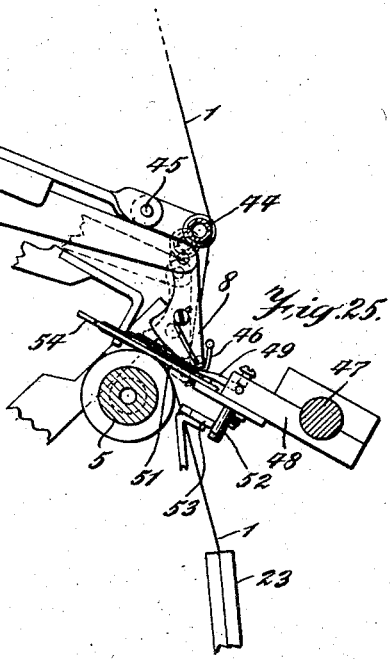

Figs. 20, 21, 22, and 23 are horizontal views taken approximately on the line 20—23 of Fig. 1 and showing successive positions occupied by various elements in attaching a thread end to a spool;

Fig. 24 is a section approximately on the line 24—24 of Fig. 23;

Fig. 25 is a section on the same plane as Fig. 2 but on an enlarged scale and showing certain of the parts in more detail;

Fig. 26 is a fragmentary view showing the operating mechanism for the traveling thread guide;

Fig. 27 is a wiring diagram of the electrical connections used with the device.

On spooling machines as now constructed and operated, empty spools are automatically fed into position to have thread wound thereon and are then ejected and new ones fed into place, all by automatic machinery. When thread breaks, however, it often happens that an attendant is not at the particular machine where the break takes place, and before an attendant does arrive, several spools may be fed into and out of winding position without having any thread wound thereon, thus causing a substantial loss of time to that machine.

According to my invention, means is provided for automatically catching the end of a broken thread and attaching it to the next spool.

Referring first to Figs. 1 and 2, I have shown therein fragmentary parts of a spooling machine by which a thread 1 is fed from a bobbin, not shown, through and over suitable guides, to waxing cylinders 2, and then through a guide 3 and an eye 4 to be wound upon a spool 5 held in position in the usual way by two opposed spindles 6 and 7. These spindles are caused to rotate by the usual mechanism, and as they rotate with the spool, the thread is wound thereon by means of a traveler 8 secured to a reciprocating shaft 9.

In Fig. 1, the thread shown at the right of the figure is being wound in substantially the usual way, just described, although with my invention applied to the apparatus for use if necessary. The apparatus shown also includes certain novel details of the construction, which will be more fully pointed out and claimed later.

In Fig. 1 I have shown two winding mechanisms as part of a battery of several, and, as noted above, the thread at the right of this figure is being wound in the usual way, whereas the thread at the left, which thread is also shown in Fig. 2, appears as it would after it had been broken and at an intermediate stage of its manipulation before starting to wind upon the spool.

In Fig. 2 I have indicated a chute 10 down which empty spools are fed and transferred to operative position by mechanism which forms no part of this invention and has accordingly not been shown. After the spools are wound, they are ejected onto a chute 11, as by mechanism which is well known in the art and consequently has not been shown.

Referring now to Figs. 3 to 18, inclusive, and more particularly to Figs. 3 to 8, I will now describe what takes place upon breaking of a thread. In this connection it might be said that the vast majority of breaks which occur in a thread do so at a point between the spool and the eye 4. Between these two points I provide a tension responsive device 12, here shown as a piece of spring steel, and which is adapted to bear upon the thread between the eye 4 and the spool.

In Fig. 3, the dot and dash line indicates the position of the thread when unbroken, and the full line position shows a position which approximates that taken by the thread as it breaks. Similarly, the position of the device 12 when the thread is unbroken is shown in Fig. 3 by dot and dash lines, whereas the full line position of the same device is approximately that which it takes when the thread breaks.

When the thread breaks, the device 12 will drop by its own weight or by the action of a spring, if desired, although a spring is not always necessary and has not been shown, it being noted that this device is mounted upon a lever 13 pivoted at 14 to the frame of the machine. Connected to the lever is a mercury switch 15, which is normally opened when the thread is intact, but is closed by movement of the lever 13 when the thread breaks.

The mechanism which I shall now describe is operated by an electric motor controlled by suitable circuits, and those circuits will be more fully described later. For the present, I shall limit my description to the mechanical features.

As the mercury switch 15 is closed, a motor 16 is caused to operate. This motor rotates a shaft 17 on which is a pinion 18 engaging a rack 19. This rack is secured to a slide 20 disposed in a vertically extending position, in the present embodiment this position being shown as slightly inclined to the vertical to accommodate itself to the machine upon which the invention is used.

The slide 20 has at its upper end a catch 21 in the form of a hook, as best shown in Fig. 18, and the motor, through the rack and pinion arrangement shown, will raise the slide and catch to a point where it will engage the upper end 1' of the broken thread and bring it downwardly to some such position as shown in Fig. 2 and at the left of Fig. 1. This is done by the following means:

The slide 20 is mounted upon a suitable slideway 22 and has at its upper end a head 23 within which the slide may also move but which is normally held in the position shown in full lines in Fig. 18 by means of a spring 24 acting between the head and a shoulder 24' on the slide. The head carries oppositely disposed pins 25. When the thread first breaks, the parts are in some such position as indicated in Fig. 3, at the bottom of which figure is shown the approximate position of the head 23. As the motor is put in operation and moves the slide upwardly, the pins 25 will enter slots 26 in a bracket 27, this bracket having spaced walls 28 and 29 (Fig. 7) between which the guide moves. It is in these walls that the slots 26 are formed. As the pins enter the slots, as indicated in Fig. 4, one of them engages beneath a lever 30 pivoted at 31 upon the bracket and normally occupying the position shown in Fig. 3, in which position it is held by means of a spring 32. At the upper end of the lever 30 is a thread holder 33, which is in the form of a fork, as best shown in Fig. 10, and which is directly back of the eye 4 through which the thread normally passes.

As the slide continues to rise, the pins 25 will force the thread holder forwardly, and the opposite tines 34 of the fork will straddle the eye 4, as shown in Figs. 5 and 10. The two tines 34 are formed of spring material spaced apart a distance somewhat less than the width of the eye 4, so that they will be forced apart by the eye to permit the thread to catch therebetween in some such position as shown at 35 in Fig. 10. The holder 33 then will carry the thread forwardly so that from the eye 4 it will extend horizontally somewhat as shown in Fig. 6. At the latter part of its movement, from the position shown in Fig. 4, to that shown in Fig. 6, the lever 30 engages a cam 36 upon the bracket and is forced to one side of the eye and is thus displaced laterally of the eye to the position shown in Figs. 7 and 12.

This entire movement of the thread holder 33 is of course caused by the continued rise of the pins 25 in the slots 26, and one of these pins engages beneath the arm 13' connected to the lever 13 forming part of the tension responsive device, and raises it to some such position as shown in Fig. 6. The member 12 can reach this position by snapping past the slide 20 and parts carried thereby, it being remembered that this member is in the form of a leaf spring. By that time the head 23 has been moved upwardly to a point where the pins 25 engage the ends of the slots 26 and continued movement of the slide will cause the catch 21 to continue movement against the action of the spring 24 until the catch comes to some such position as indicated in dotted lines in Fig. 18 and as indicated in full lines in Figs. 6 and 7. The catch is in the form of a hook, as shown, and this hook has an inclined upper end 37 which will cause it to ride by the thread, and then the thread can snap under the hook, which likewise has an inclined under edge 38 to retain the thread within the hook.

By means to be described later, the motor is now reversed and, through the rack and pinion arrangement described, moves the slide 20 downwardly. The first effect of this movement is to relieve the force on the spring 24 so that the catch 21 moves back into the head 23 carrying the thread with it. As the catch moves into the head, the broken end of the thread is severed between the catch 21 and a knife 39 (Fig. 19) carried by the head, and on the other side of the catch the thread is held between the catch 21 and a clamp 40.

As the slide and head descend, the holder 33 is allowed to return to its initial position. As best shown in Figs. 7 and 12, and as described above, this holder is now on one side of the catch 21, being held there by the cam 36, and it is caused by that cam to return to its initial position by a different path than that by which it reached the position shown in Figs. 6 and 7, in order to avoid entanglement with the thread which by that time has reached its normal position through the eye 4, as shown in Fig. 8. This operation is facilitated by the fact that the lever 30 in its normal inoperative position is pressed against the bracket by means of a spring 41, but is loosely mounted on its pivot 31. The spring 32, lighter than the spring 41, tends to hold the lever 30 in the position shown in Figs. 7 and 12, in which act the cam 36 always assists. This is to insure that the holder 33 will not tangle with the thread. However, the action of the spring 32 is not enough to prevent engagement of the lever by the spring 41 upon its return to normal position.

In Fig. 8 the thread 1 is shown as again being conducted through the eye 4 and being pulled downwardly by means of the slide 20. A loose end 43, severed by the action of the knife 39, is suspended in the holder 33 and may be removed by the attendant, when convenient.

The downward movement of the slide 20, and with it the cam 21 and the thread engaged thereby, continues until the thread reaches some such position as shown at the left of Fig. 1, in which it is ready to be placed upon the spool. The motor continues operation until the thread is brought to some such position and then is stopped by mechanism which will be described more fully later.

I shall now describe the means for attaching the thread to the spool, this means being best shown in Figs. 20 to 25, inclusive, and appearing also in Figs. 1 and 2.

The thread engaged by the catch having been brought down to some such position as shown at the left of Fig. 1, extends over a roller 44 which is of sufficient length so that the thread will engage it, not only when it is in the position shown at the left of Fig. 1, but also when it is being wound upon the spool, as shown, for example, at the right of Fig. 1. This roller, as shown in Figs. 3 and 6, is mounted on an arm pivoted to the frame of the machine at 45, so that the upward movement of the slide may force the roller back. The thread is disposed a short distance in front of the guide wire 46, as shown in Fig. 20, this guide wire being connected to one side of the mouth of the traveler 8 and extending from that traveler towards and beyond the position occupied by the thread 1 in Fig. 20.

Mounted on a reciprocating shaft 47 is a block 48 to which is secured a carry-over wire 49 having at its end a hook 50 adapted to catch the thread. It will be seen that this wire extends parallel to the shaft 47 instead of at right angles thereto, as is usual, and that the head 23 may move freely without coming in contact with the carry-over wire, as best shown in Fig. 20. Pivoted on the block 48 is a carry-in finger 51 in the form of a bell crank lever having a roller 52 on one arm thereof adapted to engage a cam 53 on the frame of the machine. The other arm has at its end a fork 54, the function of which will presently appear.

Figure 20:
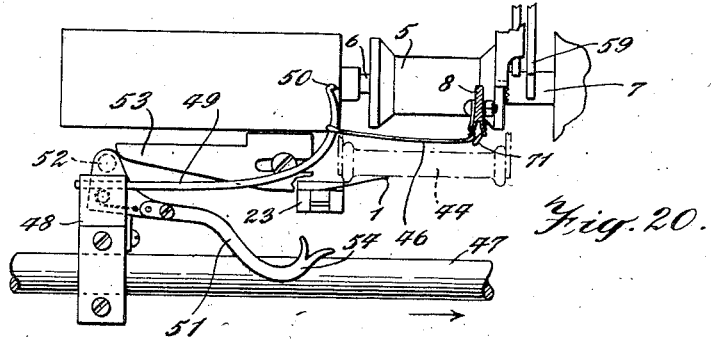

Assuming now that the parts are in the position shown in Fig. 20, suitable means is put in operation to reciprocate the shaft 47. This reciprocation takes place periodically at such a time as normally will find a full spool in position between the spindles 6 and 7. However, I have assumed that the thread has been broken and that the partly wound spool has been ejected or is about to be, and a new spool put in winding position in its place. Such new spool is shown in the drawings, for convenience of description and illustration. The shaft 47 is first moved towards the right of Figs. 20 to 23, and the successive positions of the various parts are shown in those figures. It might be said here, however, that if the thread has not been broken, its end will be engaged in the traveler 8 as usual, and then the hook 50 of the carry-over wire will operate in the usual way. While the carry-in finger 51 would go through its motions, those motions would not have any effect upon the thread, unless it has been broken. However, as stated above, I assume here that the thread has been previously broken and is held in the position shown in Fig. 20 and at the left of Fig. 1.

Figure 21:
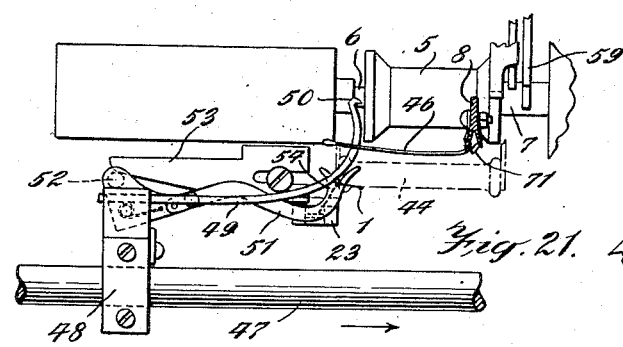
Figure 22:
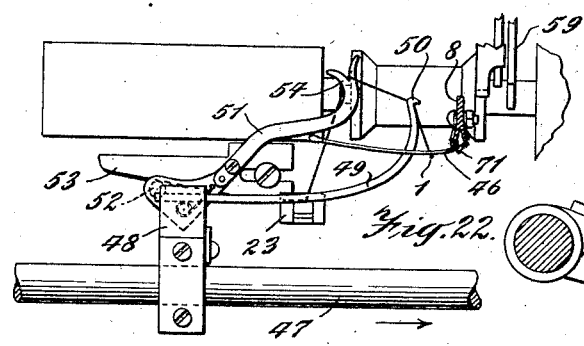

On the above assumption, the first thing that happens is an engagement of the thread by the fork of the finger 51 which is forced into engagement with the thread by the action of the cam 53. The thread is moved by the finger 51 into engagement with the guide wire 46 and the carry-over wire 49, the carry-in finger passing beneath both of these parts. Intermediate stages when the above operation is taking place are shown in Figs. 21 and 22.

As the shaft 47 continues to travel to the right, the thread is thus carried into the mouth of the traveler 8, and the thread beneath this traveler is stretched in an approximately horizontal direction to some such position as indicated at 55 in Fig. 23, in which position it is stretched across the flange 56 of the empty spool 5 and beneath the hook 57 of a knife 58 (Figs. 23 and 24). This knife is quite well known in the art and operates in the usual manner, namely, to sever and secure the thread, this being accomplished by movement of the knife along a shearing and holding member 59. The operation of the knife may be caused, for example, by the mechanism shown in the patent to Weild 51,907. The portion of the thread engaging the fork 54 is then left loose and the spindle 7 is moved outwardly to drop the spool it has been holding, and then is moved inwardly to clamp the other end of the thread against a new spool that has been moved into winding position during this interval. In other words, after the thread is engaged in the traveler, the carry-over wire, knife, and spindle function in the usual manner, the carry-in finger cooperating therewith in the novel manner just described, in order to bring the thread into position where the other parts may function. The operating means for the knife 58 and spindle 7 has been omitted, since such means are well known in the art and are not necessary to an understanding of this invention.

After the thread is engaged with the spool, the shaft 47 may be moved towards the left, as viewed in Figs. 20 to 23, and the winding of the spool may take place by rotation of the spindles 6 and 7 in the usual manner, during which time a knife (not shown) may operate to sever the thread between the spool and the spindle 7 in the usual way. Here again this operation in itself is well known in the art, as shown, for example, in said Weild Patent 51,907, and further description thereof is not deemed necessary.

The shaft 47 corresponds to the shaft upon which the carry-over wires are usually mounted, although, as pointed out above, such wires are usually disposed at right angles to the shaft. The means for reciprocating the shaft is shown conventionally in Fig. 26, where the shaft is shown as operated by a link 61 connected to a bell crank lever 62 having a roller engaging in a cam groove 63 on a rotating cam 64.

I shall now describe certain novel details which are embodied in the apparatus already described.

Referring first to Figs. 6, 8, and 11, I have shown the eye 4 as split to provide a spiral slot 65 so that the thread may be readily inserted and removed from the opening 66 through this slot without having to insert the end of the thread through the opening. By this arrangement the thread is held in the eye without danger of accidental displacement, while easy placing in and removal of the thread from the eye is provided for.

Referring now particularly to Figs. 13, 14, and 15, I have shown therein the detail construction of the traveler 8. This traveler is provided with a mouth 67 formed of two walls 68, 69. To the wall 68 is secured the guide wire 46 referred to above, which may conveniently enter the mouth and pass through a hole in the wall 68 to be secured to the traveler beneath the head of a bolt 70. On the other side of the mouth is a spring 71 passing through an opening in the wall 69 and secured in place beneath the nut 72 of the bolt 70. The spring 71 has a loop therein, as plainly shown in Figs. 14 and 15, and this loop is shown as in close proximity to the wire 46 where it bends around the edge of the wall 68. It will be seen that this arrangement forms a flaring aperture for the thread 1, which can force its way between the smooth rounded surfaces formed by the members 46 and 71 into the mouth 67.

Referring now to the wiring diagram shown in Fig. 27, I shall describe the means shown therein for performing and controlling the different operations previously described.

At 73 is shown a cam mounted upon a suitable shaft and which rotates at such a speed that it will periodically close the mercury switch 74. This switch either opens or closes a circuit through a solenoid 75 adapted, when energized, to open a switch 76. I have shown one switch 76 in full lines and two others dotted, to indicate that a plurality of switches may be provided and all operated by the solenoid. In practice, it is common to have a plurality of spooling spindles arranged in a bank, and I control all of these by the one mercury switch and cam, in order that the operations may take place at the proper times, as will be more apparent presently. I shall confine the discussion to one spindle of a bank for which I have here shown the connections.

The motor 16 is that which has been previously described as adapted to operate the slide 20 and is so wired as to be capable of reversal. The mercury switch 15 is indicated diagrammatically in Fig. 27, as is also a reversing switch 77 shown also in Fig. 16. This switch 77 is operated by movement of the slide by means which will be more fully described later. That is to say, when the slide moves downwardly to the position shown in Fig. 16, the switch will be in one position, and when the slide moves upwardly, the switch will be moved to a different position. The positions are indicated in Fig. 27 by the legends "Up" and "Down", respectively.

The cam 73 is so timed that the switch 74 will be open and consequently the switch 76 will be closed during the time that a spool is being wound. When the carry-in finger and associated parts are being operated, and when the spool is being ejected and an empty spool put in its place, then the cam 73 will operate to close the switch 74, energize the solenoid 75, and open the switch 76. When this switch 76 is open, the motor 16 cannot operate. This arrangement is used because operation of the motor 16 to cause reciprocation of the slide 20 would cause that slide to interfere with the carry-in finger and associated parts when they are functioning.

Assuming now that a thread should break, the switch 15 will be closed by the action of the tension responsive device, as previously described. If the switch 74 were closed, as indicated, then the switch 76 would be open and the motor could not be energized. If, however, the switch 76 should be closed, then a circuit would be completed from one side of the line 78 through the conductor 79, switch 77, conductors 80, 81, switch 15, conductor 82, switch 76, conductors 83 and 94, motor 16, and thence through the conductors 84 and 89 back to the line. The motor will then operate to move the slide up to operate the catch 21 and parts associated therewith, as previously described. Upon closing of the switch 15, one of the immediate results is to energize the winding 85 of a magnetic brake 86, which is shown in Figs. 2, 3, 4, 6, and 8. This brake engages the disks 87 on the waxing cylinders 2 and thus will stop movement of the thread. This action prevents the winding back of the loose end of the thread through the eye 4 and around the cylinders.

The energizing of the coil 85 is caused by current which passes from the switch 15 through the coil and through the conductors 88 and 89 back to the line 78. As soon as the switch 15 is opened again by the action of the catch and parts associated therewith, then the brake will be released by the de-energizing of the coil 85. The brake is shown as being applied in Fig. 3, in which the armature of the coil 85 is shown as being held in engagement with the core of the coil, and in the other figures, such as Fig. 4, for example, the brake is shown out of action.

The slide adjacent its lower end engages a spring finger 90 (Figs. 17 and 27) which is mechanically connected to a contact member 91 forming one of the contacts of a switch, the other one of which comprises a contact member 92. When the slide is in its lowermost position, these two contacts 91 and 92 are held out of engagement, as indicated in Figs. 17 and 27. When, however, the slide moves upwardly, the spring finger 90 snaps by the lower end of the slide and thus permits the contacts 91 and 92 to engage. This closes a circuit from the contact 91 through the conductors 93, 94 to the motor and thence through the conductors 84 and 89 back to the line, so that the motor may continue operation even after the switch 15 has been opened following downward movement of the slide, until such movement opens the switch 91—92.

After the slide has moved upwardly to the position where the catch 21 may engage the thread 1, as shown in Fig. 6, the reversing switch 77 is actuated to reverse the motor and thus close a circuit from one side of the line 78 through the conductor 79, switch 77, and conductor 95, to the motor, and thence through the conductors 84 and 89 back to the line. The slide 20 is thus caused to move downwardly. The switch 77 will be reversed near the end of its downward movement so that the motor will again be in a position to raise the slide. The slide will engage the spring finger 90 and thus open the switch at the contacts 91, 92, so that if the mercury switch 15 is now open, as will be the case if the thread has been drawn downwardly by the catch 21, the motor will stop operation. If, however, for any reason the catch 21 has not caught the thread and pulled it downwardly, then of course the mercury switch 15 will be closed and the reversing switch 77 will cause the motor to operate the slide to raise it again, and this operation will repeat itself until the thread is caught, or by operation of the cam 73.

Referring to Figs. 16 and 17, I will now describe the means for operating the reversing switch 77. It will be seen that this switch comprises a lever pivoted at 96 and having a forked end in position to be engaged by a pin 97 on a plate 98 slidably mounted on the guideway 22 for the slide 20. The amount of movement of the plate 98 is limited by engagement of pins 99 in slots 100, as plainly shown in Fig. 17. The plate has adjustably mounted thereon operating fingers 101 and 102 disposed at opposite ends thereof and which may be adjusted lengthwise of the plate by movement along the slots 103. These fingers may be held in adjusted position by any suitable clamping means, such as the bolt and nut arrangement indicated.

On the slide 20 is a projection 104 which is adapted to engage the fingers 101 and 102 and thus to cause movement of the plate 98 and consequent operation of the switch 77. In order to limit the downward movement of the slide, a stop is provided, here shown in the form of a hook 105 slidably mounted on the guideway and adapted to engage the projection 104. This hook may move downwardly against the action of a spring 106, and this spring is of sufficient strength to exert a braking effect through the projection 104 upon the slide 20.

While I have shown the invention as embodied in a specific form, it is to be understood that various changes in details may be made without departing from the scope of the invention, and I therefore do not intend to limit myself except by the appended claims.

I claim:

1. In a spooling machine, means to support a spool in winding position, means to wind thread upon a spool in that position, a catch adapted to engage a thread and to bring it into position to be wound on a spool at winding position, and means to actuate said catch upon breaking of the thread.

2. In a spooling machine, means to support a spool in winding position, means to wind thread upon a spool in that position, a catch adapted to engage a thread and to bring it into position to be wound on a spool at winding position, and means rendered operative upon breaking of the thread and adapted to actuate said catch and to move the thread into position to be caught by said catch.

3. In a spooling machine, means to support a spool in winding position, means to wind thread upon a spool in that position, a catch adapted to engage a thread and to bring it into position to be wound on a spool at winding position, means to reciprocate said catch to and from thread-catching position, means to stretch the thread across the path of said reciprocation, and means rendered operative upon breaking of the thread and adapted to cause operation of said reciprocating and stretching means.

4. In a spooling machine, means to support a spool in winding position, means to wind thread upon a spool in that position, a catch adapted to engage a thread and to bring it into position to be wound on a spool at winding position, means to reciprocate said catch in a direction generally parallel to the direction of movement of the thread to the spool to and from thread-catching position, means to stretch the thread across the path of said reciprocation, and means rendered operative upon breaking of the thread and adapted to cause operation of said reciprocating and stretching means.

5. In a spooling machine, means to wind thread upon a spool, a guide for the thread over which it travels before reaching the spool, a tension-responsive device located between said guide and spool, and means actuated by said tension-responsive device upon breakage of the thread between the guide and spool to catch the end of the thread and convey it into position to be wound upon a spool.

6. In a spooling machine, means to wind thread upon a spool, an eye through which the thread passes before reaching the spool, a catch actuated by breakage of the thread and adapted to catch the thread and carry it to the spool, a lever pivotally mounted adjacent said eye and having on the end thereof a thread holder, means rendered operative by breakage of the thread to move said holder past said eye to engage and stretch the thread passing therethrough transversely of the direction of movement of said catch, means to move said catch with the thread engaged thereby to a position adjacent the spool, and means to cause said holder to return to initial position.

7. In a spooling machine, means to wind thread upon a spool, an eye through which the thread passes before reaching the spool, a catch actuated by breakage of the thread and adapted to catch the thread and carry it to the spool, a lever pivotally mounted adjacent said eye and having on the end thereof a thread holder, means rendered operative by breakage of the thread to move said holder past said eye and substantially in line therewith to engage and stretch the thread passing therethrough transversely of the direction of movement of said catch, means to move said catch with the thread engaged thereby to a position adjacent the spool, and means to cause said holder to return to initial position along a path at one side of said eye.

8. In a spooling machine, means to wind thread upon a spool, an eye through which the thread passes before reaching the spool, a catch actuated by breakage of the thread and adapted to catch the thread and carry it to the spool, a thread holder normally inoperative, means rendered operative upon breakage of the thread to move said holder between said eye and the spool across the path of movement of the catch, means to operate the catch to engage the thread between the eye and the holder and to stretch it between the eye and a position adjacent the spool, and means to return said holder to its initial inoperative position along a path at one side of said eye.

9. In a spooling machine, means to wind thread upon a spool, an eye through which the thread passes before reaching the spool, a catch actuated by breakage of the thread and adapted to catch the thread and carry it to the spool, a lever pivotally mounted adjacent said eye and having on the end thereof a thread holder, means rendered operative by breakage of the thread to move said holder past said eye to engage and stretch the thread passing therethrough transversely of the direction of movement of said catch, means to move said catch with the thread engaged thereby past one side of said lever to a position adjacent the spool, and means to cause said holder to return to initial position while displacing the lever away from the thread.

10. In a spooling machine, means to wind thread upon a spool, an eye through which the thread passes before reaching the spool, a catch actuated by breakage of the thread and adapted to catch the thread and carry it to the spool, a thread holder normally inoperative, means rendered operative upon breakage of the thread to move said holder between said eye and the spool across the path of movement of the catch, means to operate the catch to engage the thread between the eye and the holder and to stretch it between the eye and a position adjacent the spool, means to return said holder to its initial inoperative position along a path at one side of said eye, and means to sever the broken end of the thread between the catch and the holder to clamp the thread to the catch.

11. In a spooling machine, means to support a spool in winding position, a slide movable from and to a point adjacent said position along the general path followed by the thread on its way to the spool, a motor adapted to actuate said slide and controlled by breakage of the thread passing to the spool, and a catch on said slide and adapted to engage the thread and carry it to said point adjacent winding position.

12. In a spooling machine, means to support a spool in winding position, a slide movable from and to a point adjacent said position along the general path followed by the thread on its way to the spool, a motor adapted to actuate said slide and controlled by breakage of the thread passing to the spool, a catch on said slide, a head slidably mounted on said slide and normally receiving said catch, means to limit movement of the head to cause the catch to project therefrom to engage the thread, a spring urging said head over said catch against the action of said limiting means, whereby the catch will pull the thread within said head upon release from said limiting means, and means to clamp the thread within the head.

13. In a spooling machine, means to support a spool in winding position, a slide movable from and to a point adjacent said position along the general path followed by the thread on its way to the spool, a motor adapted to actuate said slide and controlled by breakage of the thread passing to the spool, a catch on said slide, a head slidably mounted on said slide and normally receiving said catch, means to limit movement of the head to cause the catch to project therefrom to engage the thread, a spring urging said head over said catch against the action of said limiting means, whereby the catch will pull the thread within said head upon release from said limiting means, means to clamp the thread within the head, and means to sever the thread portion between the broken end thereof and the catch.

14. In a spooling machine, means to support a spool in winding position, a slide movable from and to a point adjacent said position along the general path followed by the thread on its way to the spool, a motor adapted to actuate said slide and controlled by breakage of the thread passing to the spool, a catch on said slide and adapted to engage the thread and carry it to said point adjacent winding position, and means automatically reversing said motor to return said catch to initial position.

15. In a spooling machine, means to support a spool in winding position, a slide movable from and to a point adjacent said position along the general path followed by the thread on its way to the spool, a motor adapted to actuate said slide and controlled by breakage of the thread passing to the spool, a catch on said slide and adapted to engage the thread and carry it to said point adjacent winding position, means automatically reversing said motor to cause said catch to reciprocate, and means rendering said motor inoperative after said catch has engaged the thread and carried it to said winding position.

16. In a spooling machine, means to support a spool in winding position, means to wind thread upon a spool in that position, a catch adapted to engage a thread and to bring it into position to be wound on a spool at winding position, means to actuate said catch upon breaking of the thread, and means limiting operation of said catch to the time when thread normally would be being wound upon a spool.

17. In a spooling machine, means to support a spool in winding position, means to wind thread upon a spool in that position, a catch adapted to engage a thread and to bring it into position to be wound on a spool at winding position, means to actuate said catch upon breaking of the thread and including an electric motor, and a switch in the circuit of said motor closed to permit operation thereof only during the time when thread normally would be being wound upon a spool.

18. In a spooling machine, means to support a spool in winding position, means to wind thread upon a spool in that position, a catch adapted to engage a thread and to bring it into position to be wound on a spool at winding position, means to actuate said catch upon breaking of the thread, and means to stop movement of the thread upon said breaking of the thread.

19. In a spooling machine, means to support a spool in winding position, means to wind thread upon a spool in that position, a catch adapted to engage a thread and to bring it into position to be wound on a spool at winding position, an electric motor to actuate said catch, and a switch normally open but closed upon breakage of the thread to operate said motor.

20. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, and a brake put in operation by the same switch and stopping movement of the thread.

21. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, and a second switch closed at certain periods only and in series with the first-named switch.

22. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, and means to stop said actuation of the catch after the thread is caught thereby.

23. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, and a second switch in parallel with said first-named switch and normally open, but closed by movement of the catch away from its normal inoperative position.

24. In a spooling machine, means to support a spool in winding position, means to wind thread upon a spool in that position, a catch adapted to engage a thread and to bring it into position to be wound on a spool at winding position, means to actuate said catch upon breaking of the thread, and means to attach said thread to said spool.

25. In a spooling machine, means to support a spool in winding position, means to wind thread upon a spool in that position, a catch adapted to engage a thread and to bring it into position to be wound on a spool at winding position, means to actuate said catch upon breaking of the thread, a traveler to guide thread to said spool while it is being wound thereon, means acting between the traveler and the catch to guide the thread into the traveler, and means to attach the thread to the spool.

26. In a spooling machine, means to support a spool in winding position, means to wind thread upon a spool in that position, a catch adapted to engage a thread and to bring it into position to be wound on a spool at winding position, means to actuate said catch upon breaking of the thread, a traveler to guide thread to said spool while it is being wound thereon, means acting between the traveler and the catch to guide the thread into the traveler, means to attach the thread to the spool, and means to actuate said guiding and attaching means at predetermined times, independently of the operation of the catch.

27. In a spooling machine, means to support a spool in winding position, means to wind thread upon a spool in that position, a catch adapted to engage a thread and to bring it into positon to be wound on a spool at winding position, means to actuate said catch upon breaking of the thread, a traveler to guide thread to said spool while it is being wound thereon, a carry-over wire actuated periodically to bring unbroken thread into engagement with said traveler during normal operation of the machine, a carry-in finger adapted to cooperate with said wire and catch to bring a thread held by the catch into engagement with said traveler, and means to operate said finger and wire together.

28. In a spooling machine, a catch adapted to hold an end of a previously broken thread adjacent a spool in winding position, a traveler to guide thread to said spool, a reciprocating shaft substantially parallel to the axis of the spool, a carry-over wire on said shaft, a carry-in finger likewise on said shaft, means to reciprocate said shaft, and means operating during said reciprocation to move said finger with respect to said wire to carry said thread into engagement with said traveler.

29. In a spooling machine, a catch adapted to hold an end of a previously broken thread adjacent a spool in winding position, a traveler to guide thread to said spool, a reciprocating shaft substantially parallel to the axis of the spool, a carry-over wire rigidly fixed to said shaft, a carry-in finger pivotally mounted on said shaft, means to reciprocate said shaft, and means operating during said reciprocation to move said finger on its pivot to carry said thread into engagement with said traveler.

30. In a spooling machine, a carry-over wire adapted to engage the thread and carry it into position to be clamped against the spool, a traveler adapted to guide the thread onto the spool and having a mouth in which the thread is adapted to be received, a guide wire extending from one side of said mouth towards said carry-over wire and along which said carry-over wire is adapted to move the thread into the mouth, and a spring extending across the mouth and normally closing it but adapted to be forced one side by the thread upon entering the mouth and then to close the mouth to yieldingly hold the thread therein.

31. In a spooling machine, means to support a spool in winding position, means to wind thread upon a spool in that position, a catch adapted to engage a thread and to bring it into position to be wound on a spool at winding position, a knife adjacent said catch to sever a broken end of said thread after engagement thereof by said catch, and means to actuate said catch and knife and rendered operative upon breaking of the thread, said catch during its actuation moving the thread past said knife to sever the thread.

32. In a spooling machine, means to support a spool in winding position, means to wind thread upon a spool in that position, a catch adapted to engage a thread and to bring it into position to be wound on a spool at winding position, a knife disposed adjacent said catch, and means rendered operative upon breaking of the thread to actuate said catch and to cause the knife to sever the broken end of thread engaged by the catch.

33. In a spooling machine, means to support a spool in winding position, means to wind thread upon a spool in that position, a catch adapted to engage a thread and to bring it into position to be wound on a spool at winding position, means to actuate said catch and rendered operative upon breaking of the thread, and means operated by said actuation of the catch and adapted to move the thread into position to be caught by said catch.

34. In a spooling machine, means to support a spool in winding position, means to wind thread upon a spool in that position, one or more cylinders rotatably mounted in position to be contacted by the thread on its way to said winding position, a catch adapted to engage a broken thread end between said winding position and said cylinders and to bring it into position to be wound on a spool at winding position, means to actuate said catch upon breaking of the thread, and a brake automatically operating upon breaking of the thread to stop rotation of said cylinders.

35. In a spooling machine, means to support a spool in winding position, means to wind thread upon a spool in that position, a catch adapted to engage a thread and to bring it into position to be wound on a spool at winding position, a device responsive to the tension of said thread, and means actuated by said tension responsive device upon breakage of the thread to actuate said catch.

36. In a spooling machine, means to support a spool in winding position, means to wind thread upon a spool in that position, a catch adapted to engage a thread and to bring it into position to be wound on a spool at winding position, an electric motor adapted to operate said catch, a switch in the circuit of said motor, a device responsive to the tension of said thread, and means actuated by said tension responsive device upon breakage of the thread to close said switch and operate the motor.

37. In a spooling machine, means to support a spool in winding position, means to wind thread upon a spool in that position, a catch adapted to engage a thread and to bring it into position to be wound on a spool at winding position, an electric circuit having means therein to control the operation of said catch, a switch in said electric circuit, a device responsive to the tension of said thread, and means actuated by said tension responsive device upon breakage of the thread to operate said switch and thereby to actuate said catch.

38. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, and means to close said first-named switch to stop operation of said motor after the thread is caught by said catch.

39. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, and means operated by said thread to stop said actuation of the catch after the thread is caught thereby.

40. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, and means operated by said thread to close said first-named switch to stop operation of said motor after the thread is caught by said catch.

41. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, means to stop said actuation of the catch after the thread is caught thereby, and a third switch controlling operation of said motor and permitting said operation of the motor only during the time when thread normally would be being wound upon a spool.

42. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, means to close said first-named switch to stop operation of said motor after the thread is caught by said catch, and a third switch controlling operation of said motor and permitting said operation of the motor only during the time when thread normally would be being wound upon a spool.

43. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, means operated by said thread to stop said actuation of the catch after the thread is caught thereby, and a third switch controlling operation of said motor and permitting said operation of the motor only during the time when thread normally would be being wound upon a spool.

44. In a spooling machine, means to support a spool in winding position, means to wind thread upon a spool in that position, a catch adapted to engage a thread and to bring it into position to be wound on a spool at winding position, an electric motor to actuate said catch, a switch normally open but closed upon breakage of the thread to operate said motor, a reversing switch automatically operating to cause repeated reciprocation of the catch to engage the thread, means operated by said thread to close said first-named switch to stop operation of said motor after the thread is caught by said catch, and a third switch controlling operation of said motor and permitting said operation of the motor only during the time when thread normally would be being wound upon a spool.

45. In a spooling machine, means to support a spool in position to have thread wound thereon, a traveler movable adjacent said spool and having a mouth through which thread passes on its way to the spool, said mouth being formed by opposite walls, a guide wire extending laterally of said mouth and curved over the edge of one of said walls to the inside of the mouth, and a spring secured to the opposite wall and normally contacting with said guide wire to close said mouth, said spring and said wire having their contacting surfaces flaring away from each other to permit a thread to force them apart.

THOMAS J. NUNAN.